(12) United States Patent
Sullivan et al.

(10) Patent No.: US 12,196,176 B2
(45) Date of Patent: Jan. 14, 2025

(54) ARTICULATED CLAMP FIXTURE FOR WIND TURBINE BLADE

(71) Applicant: BNSF Logistics, LLC, Dallas, TX (US)

(72) Inventors: Andrew J. Sullivan, Bedford, TX (US); Dwayne M. Ganner, Grapevine, TX (US); John L. Ferris, Colleyville, TX (US); Christof J. Hettiger, Irving, TX (US); Alejandra Soltero, Fort Worth, TX (US); James W. V. Tabije, Coppell, TX (US)

(73) Assignee: BNSF Logistics, LLC, Dallas, TX (US)

( * ) Notice: Subject to any disclaimer, the term of this patent is extended or adjusted under 35 U.S.C. 154(b) by 270 days.

(21) Appl. No.: 17/860,476

(22) Filed: Jul. 8, 2022

(65) Prior Publication Data

US 2024/0011468 A1    Jan. 11, 2024

(51) Int. Cl.
*F03D 13/40*    (2016.01)

(52) U.S. Cl.
CPC .......... *F03D 13/40* (2016.05); *F05B 2260/02* (2013.01)

(58) Field of Classification Search
CPC .... F03D 13/40; F03D 13/401; F05B 2260/02; Y02E 10/72
See application file for complete search history.

(56) References Cited

U.S. PATENT DOCUMENTS

| | | | |
|---|---|---|---|
| 7,591,621 B1 | 9/2009 | Landrum et al. | |
| 7,670,090 B1 | 3/2010 | Andrum et al. | |
| 7,690,875 B2 * | 4/2010 | Grabau | F03D 1/0633 410/44 |
| 7,704,024 B2 * | 4/2010 | Kootstra | B65D 90/004 410/44 |
| 8,708,625 B1 | 4/2014 | Landrum et al. | |
| 8,834,082 B1 | 9/2014 | Landrum et al. | |
| 8,985,920 B2 * | 3/2015 | Bitsch | F03D 13/40 410/44 |
| 9,315,200 B1 | 4/2016 | Andrum et al. | |
| 9,347,426 B2 | 5/2016 | Landrum et al. | |
| 9,494,140 B2 | 11/2016 | Sigurdsson | |
| 9,522,626 B2 | 12/2016 | Hansen et al. | |
| 9,567,969 B2 | 2/2017 | Sigurdsson | |
| 9,638,162 B1 | 5/2017 | Fletcher et al. | |
| 9,701,236 B2 | 7/2017 | Thomsen et al. | |
| 9,738,458 B2 * | 8/2017 | Schmidt | B65G 47/82 |
| 9,790,927 B1 | 10/2017 | Landrum et al. | |

(Continued)

*Primary Examiner* — Ko H Chan
(74) *Attorney, Agent, or Firm* — Whitaker Chalk Swindle & Schwartz PLLC; Enrique Sanchez, Jr.

(57) ABSTRACT

An articulated support fixture for a wind turbine blade includes a base frame with first and second bearing slide areas and first and second bearing blocks disposed to slide thereabout, each bearing block including a laterally oriented bearing. A fixture mount with a laterally oriented axle engages the laterally oriented bearings enabling the fixture mount to articulate about the lateral axle. The first and second bearing slide areas are configured to enable the first and second bearing blocks, together with the fixture mount, to slide along a generally longitudinal path, and to enable rotation of the fixture mount about a vertical axis as the first and second bearing blocks cooperatively slide upon the first and second bearing slide areas. A wind turbine blade interface is attached to the fixture mount, to enable engagement with, and support of, the wind turbine blade.

22 Claims, 11 Drawing Sheets

(56) References Cited

U.S. PATENT DOCUMENTS

| | | |
|---|---|---|
| 10,030,633 B2 | 7/2018 | Sigurdsson |
| 10,428,800 B2 | 10/2019 | Van Der Zee |
| 10,502,191 B2 | 12/2019 | Thomsen et al. |
| 10,641,248 B2 | 5/2020 | Thomsen et al. |
| 10,697,437 B1 | 6/2020 | Alvarez et al. |
| 10,718,314 B2 | 7/2020 | Van Der Zee et al. |
| 10,731,634 B2 | 8/2020 | Bangar et al. |
| 10,738,766 B2 | 8/2020 | Fletcher et al. |
| 10,844,841 B2 | 11/2020 | Sullivan et al. |
| 10,890,163 B2 | 1/2021 | Kastrup et al. |
| 10,954,920 B2 | 3/2021 | Botwright et al. |
| 10,995,735 B1 | 5/2021 | Sullivan et al. |
| 11,807,153 B2 * | 11/2023 | Keller .................. E04H 12/00 |
| 2013/0315685 A1 * | 11/2013 | Pedersen ................ B60P 3/40 410/44 |
| 2014/0064870 A1 * | 3/2014 | Thomsen ................ B60P 3/40 410/44 |
| 2016/0053740 A1 * | 2/2016 | Landrum ............ B61D 45/001 414/800 |
| 2021/0071643 A1 | 3/2021 | Jensen et al. |

* cited by examiner

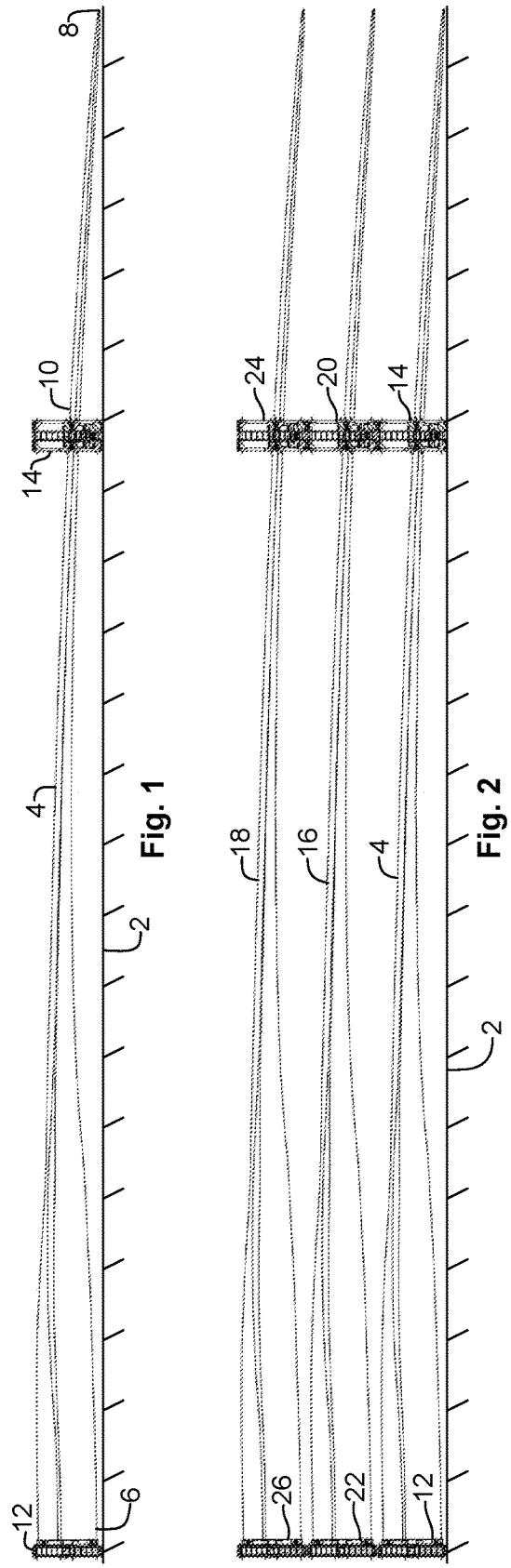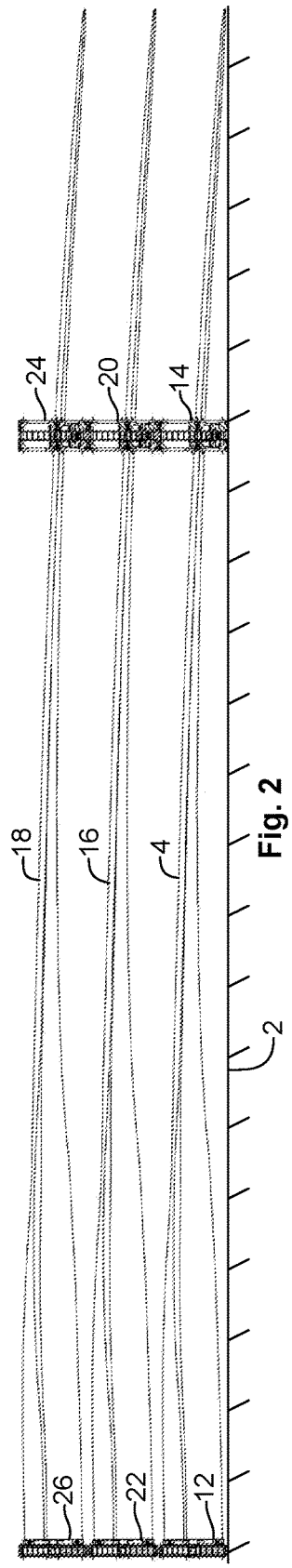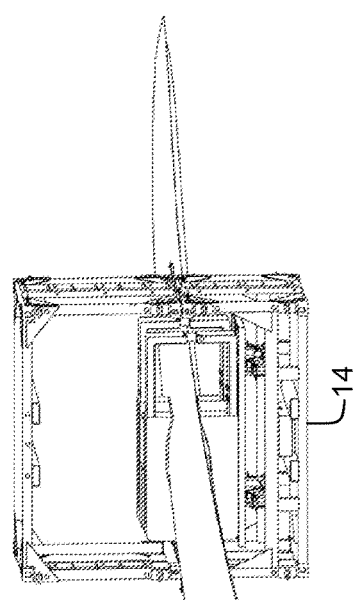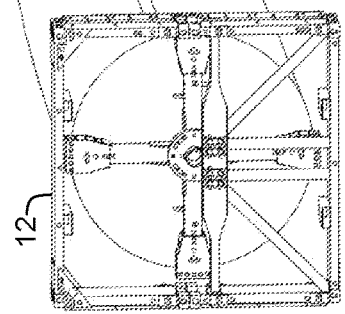
Fig. 1
Fig. 2
Fig. 3

Section A-A

Section B-B

Section C-C

ARTICULATED CLAMP FIXTURE FOR WIND TURBINE BLADE

RELATED APPLICATIONS

None.

FIELD OF THE INVENTION

The present invention relates to support fixtures for the transportation and storage of wind turbine blades. More particularly, the present invention relates to support fixtures that accommodate dynamic variations in the spacing and angular position between individual support points upon a wind turbine blade with respect to such support fixtures.

DESCRIPTION OF THE RELATED ART

The continued growth of wind power utilization has led to increasingly larger wind turbine structures, which comprise wind turbine blades that now exceed 80 meters in length, and are expected to reach 105 meters in the near future. This presents a number of challenges in the field of logistics for storage and transportation of wind turbine components from the points of manufacturer to the points of utilization. Important modes of transporting wind turbine blades include truck, rail, ocean, barge, storage holding points in route, as well as trans-loading therebetween. In the case of very long and relatively fragile wind turbine blades, consideration of the flexural variations that occur between support points, which result in variations in the length between support points and variations in the angular positions of the blade engagement members such a support cradles and clamps, increasingly need to be taken into consideration in fixture designs.

As a wind turbine blade and its support fixtures rest upon a surface, such as a dock, a ship/barge, a truck chassis, or a consist of railcars, it is exposed to dynamic forces that result in flexing of the blade, as well as relative movement of the support positions during transit. Even wind loads that occur during static storage on firm surfaces induce these flexing actions. Much like a chain hanging along a catenary path by virtue of its weight, wind turbine blades also 'hang' and flex from support fixtures. This induces variations in the relative position and angles of support for a turbine blade, which vary over time to some degree as loads are applied. Where the contact positions along the blade are fixed, such as bolting to an end flange, or cradling and clamping along the blade, such flexing can result in undue stress within the blade structure, absent adequate accommodation by the support fixtures, leading to a risk of blade damage.

The assignee of the present disclosure holds a range of US patents that are germane to the logistics of wind turbine blade storage and transportation. These patents are listed below, and the entire contents and teachings of all of these patents are hereby incorporated by reference, in their entirety and for all purposes.

A) U.S. Pat. No. 7,591,621 issued on Sep. 22, 2009 to Landrum et al. for Wind Turbine Blade Transportation System and Method.
B) U.S. Pat. No. 7,670,090 issued on Mar. 2, 2010 to Landrum et al. for Wind Turbine Blade Transportation System and Method.
C) U.S. Pat. No. 8,708,625 issued on Apr. 29, 2014 to Landrum et al. for Wind Turbine Blade Railroad Transportation System and Method.
D) U.S. Pat. No. 8,834,082 issued on Sep. 16, 2014 to Landrum et al. for Wind Turbine Blade Railroad Transportation System and Method.
E) U.S. Pat. No. 9,315,200 issued on Apr. 19, 2016 to Landrum et al. for Wind Turbine Blade Railroad Transportation With Two Axis Translation.
F) U.S. Pat. No. 9,347,426 issued on May 24, 2016 to Landrum et al. for Wind Turbine Blade Railroad Transportation System and Method.
G) U.S. Pat. No. 9,494,140 issued on Nov. 15, 2016 to Sigurdsson for Frame Support Assembly For Transporting Wind Turbine Blades.
H) U.S. Pat. No. 9,567,969 issued on Feb. 14, 2017 to Sigurdsson for Systems and Methods For Transporting Wind Turbine Blades.
I) U.S. Pat. No. 9,790,927 issued on Oct. 17, 2017 to Landrum et al. for Wind Turbine Blade Double Pivot Transportation System and Method.
J) U.S. Pat. No. 10,030,633 issued Jul. 24, 2018 to Sigurdsson for System and Method for Transporting Wind Turbine Blades.
K) U.S. Pat. No. 10,697,437 issued Jun. 30, 2020 to Alvarez et al. for Rotatable Support Fixture for Wind Turbine Blade.
L) U.S. Pat. No. 10,844,841 issued on Nov. 24, 2020 to Sullivan et al. for Transportation Fixtures for wind Turbine Blades.
M) U.S. Pat. No. 10,995,735 issued on May 4, 2021 to Sullivan et al. for Universal Root End Support Fixture for Wind Turbine Blade.

Considering the foregoing, its can be appreciated that there is a need in the art for improved fixtures designed to accommodate the problems in the arts of storage and transportation of wind turbine blades.

SUMMARY OF THE INVENTION

The need in the art is addressed by the systems and methods of the present invention. The present disclosure teaches an articulated support fixture for a wind turbine blade that has a root-end, a support region, and a tip-end, all along a generally longitudinal axis. The support fixture includes a base frame with horizontally disposed first and second bearing slide areas with first and second bearing blocks disposed thereupon to slide thereabout, with each bearing block including a laterally oriented bearing. The support fixture further includes a fixture mount with a laterally oriented axle having first and second bearing portions that correspondingly engage the laterally oriented bearings of the first and second bearing blocks, to thereby enable the fixture mount to articulate about the lateral axle. The first and second bearing slide areas are configured to enable the first and second bearing blocks, together with the fixture mount, to slide along a generally longitudinal path, and to enable rotation of the fixture mount about a vertical axis as the first and second bearing blocks cooperatively slide upon the first and second bearing slide areas. Also included is a wind turbine blade interface that is attached to the fixture mount, to enable engagement with, and support of, the wind turbine blade along its support region.

In a specific embodiment, the foregoing articulated support fixture further includes anti-friction covers disposed upon the bearing slide areas, to thereby reduce friction therebetween.

In a specific embodiment of the foregoing articulated support fixture, the bearing blocks have limited range of motion to slide upon the bearing slide areas by interference between the bearing blocks or the fixture mount and the base frame.

In a specific embodiment of the foregoing articulated support fixture, the laterally oriented bearings are holes formed into the first and second bearing blocks.

In a specific embodiment of the foregoing articulated support fixture, the first and second bearing portions of the laterally oriented axle are cylindrical members of the fixture mount, which rotatably engage the laterally oriented bearings in the first and second bearing blocks.

In a specific embodiment of the foregoing articulated support fixture, the first and second retention members are fixed to the base frame and aligned to retain the first and second bearing blocks against upward vertical movement.

In a specific embodiment of the foregoing articulated support fixture, the base frame includes plural twistlock corner castings disposed at several of its corner positions thereof, and further includes a stacking frame with plural twistlock corner castings disposed at its corner positions, and arranged for positioning over the wind turbine blade and connection to the base frame using the twistlock fasteners, and further configured to engage a second base frame upon an upper portion thereof, to thereby stack plural wind turbine blades.

In a specific embodiment, the foregoing articulated support fixture further includes a generally planar platform fitted to an upper portion of the fixture mount for presenting a flat surface to support the wind turbine blade interface.

In a specific embodiment, the foregoing articulated support fixture further includes an inclined mount adapter disposed between the fixture mount and the wind turbine blade interface to enable selective rotational positioning of the wind turbine blade within the articulated support fixture.

In a specific embodiment of the foregoing articulated support fixture, the wind turbine blade interface includes a lower conformal clamp portion fitted to the fixture mount, and further includes an upper conformal clamp portion selectively attachable to the lower conformal clamp portion, to thereby apply clamping force about the support region of the wind turbine blade.

In a specific embodiment of the foregoing articulated support fixture, a position lock member is positioned between the base frame and the fixture mount to selectively lock and release movement and rotation of the fixture mount with respect to the base frame.

The present disclosure teaches a method of providing articulated support of a wind turbine blade that has a root-end, a support region, and a tip-end, all along a generally longitudinal axis, using a base frame, bearing blocks with laterally oriented bearings, a fixture mount with a lateral axle that has bearing portions, and a wind turbine blade interface. The method includes the steps of selecting first and second bearing slide areas laying horizontally upon the base frame, and disposing first and second bearing blocks to slide about the first and second bearing slide areas, and, engaging first and second bearing portions of the fixture mount laterally oriented axle with the laterally oriented bearings of the first and second bearing blocks, thereby enabling the fixture mount to articulate about the lateral axle. The method also includes defining the area of the first and second bearing slide areas, thereby enabling the first and second bearing blocks, together with the fixture mount, to slide along a generally longitudinal path, and further enabling rotation of the fixture mount about a vertical axis as the first and second bearing blocks cooperatively slide upon the first and second bearing slide areas, and, attaching a wind turbine blade interface to the fixture mount, thereby engaging and supporting the wind turbine blade along its support region.

In a specific embodiment, the foregoing method further includes disposing anti-friction covers upon the bearing slide areas, thereby reducing friction between the bearing slide areas and the bearing blocks.

In a specific embodiment, the foregoing method further includes limiting the range of movement of the bearing blocks upon the bearing slide areas in the defining step by interfering with the bearing blocks movement using the fixture mount and the base frame structures.

In a specific embodiment of the foregoing method, the laterally oriented bearings are holes formed into the bearing blocks, and the first and second bearing portions of the laterally oriented axle are cylindrical members of the fixture mount, and further includes the steps of rotatably engaging the cylindrical members of the fixture mount with the holes formed in the bearing blocks.

In a specific embodiment, the foregoing method further includes attaching and aligning first and second retention members to the base frame to retain the first and second bearing blocks against upward vertical movement.

In a specific embodiment of the foregoing method, wherein the base frame includes plural twistlock corner castings positioned at its corner positions, the method further includes positioning a stacking frame over the wind turbine blade, the stacking frame having plural twistlock corner castings positioned at its corner positions, and connecting the stacking frame to the base frame using the plurality of twistlock fasteners.

In a specific embodiment, the foregoing method further includes fitting a generally planar platform to an upper portion of the fixture mount, thereby presenting a flat surface for connecting the wind turbine blade interface.

In a specific embodiment, the foregoing method further includes attaching an inclined mount adapter between the fixture mount and the wind turbine blade interface, thereby enabling selective rotational position of the wind turbine blade within the articulated support fixture.

In a specific embodiment of the foregoing method, wherein the wind turbine blade interface includes a lower conformal clamp portion fitted to the fixture mount, and an upper conformal clamp portion selectively attachable to the lower conformal clamp portion, the method further includes applying clamping force about the support region of the wind turbine blade between the lower conformal clamp portion and the upper conformal clamp portion.

In a specific embodiment of the foregoing method, wherein the articulated support fixture further includes a position lock member disposed between the base frame and the fixture mount, the method further includes selectively locking and releasing movement and rotation of the fixture mount with respect to the base frame.

BRIEF DESCRIPTION OF THE DRAWINGS

FIG. 1 is an elevation drawing of a wind turbine blade supported by shipping and storage fixtures according to an illustrative embodiment of the present invention.

FIG. 2 is an elevation drawing of plural stacked wind turbine blades supported by shipping and storage fixtures according to an illustrative embodiment of the present invention.

FIG. 3 is a perspective view drawing of a wind turbine blade supported by shipping and storage fixtures according to an illustrative embodiment of the present invention.

DESCRIPTION OF THE INVENTION

Figure 4:
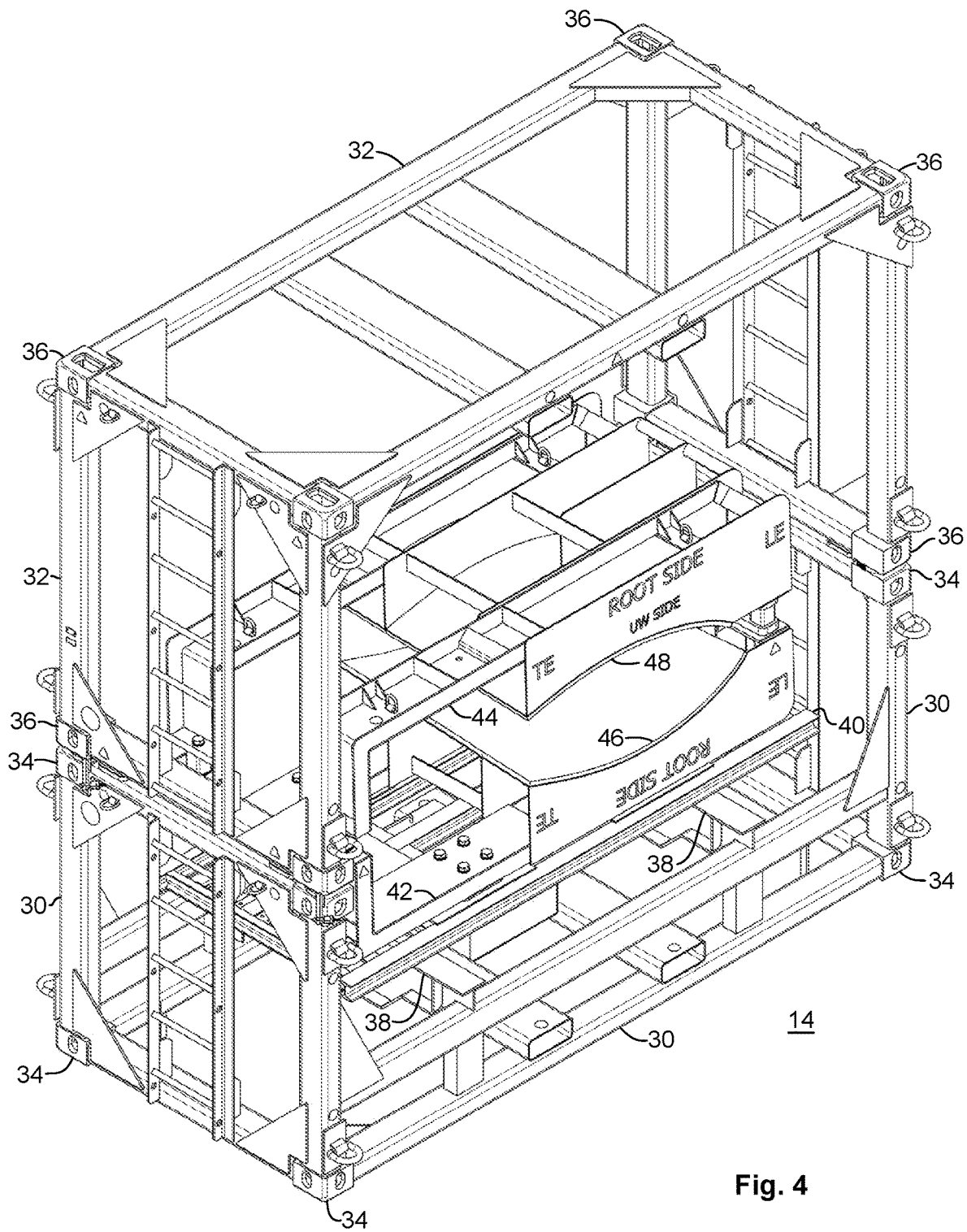
FIG. 4 is a perspective view drawing of an articulated clamping fixture according to an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof, and additional fields in which the present invention would be of significant utility.

In considering the detailed embodiments of the present invention, it will be observed that the present invention resides primarily in combinations of steps to accomplish various methods or components to form various apparatus and systems. Accordingly, the apparatus and system components, and method steps, have been represented where appropriate by conventional symbols in the drawings, showing only those specific details that are pertinent to understanding the present teachings so as not to obscure the disclosure with details that will be readily apparent to those of ordinary skill in the art having the benefit of the disclosures contained herein.

In this disclosure, relational terms such as first and second, top and bottom, upper and lower, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

Those skilled in the art of wind turbine blade logistics will be aware of the challenges in loading, securing, and transporting long structures, such as wind turbine blades (also referred to herein as a "blade" or "blades"). At the time of this writing, commercial wind turbine blades range in length to approximately 80 meters, and longer blades, up to 105 meters, are presently envisioned by suppliers. These blades are sturdy in their deployed application, however, transportation support and fixture configurations challenge the structural design of the blades. Typically, such blades are supported at two locations, the root end flange and a support region somewhere along the blade's midsection. Often times, the blade is reinforced along the support region to address the transportation loading and clamping forces that may occur. Due to the long length of wind turbine blades, they tend to droop under the force of gravity between the support locations. When such drooping occurs, there is a natural catenary effect, where gravity and dynamic forces tend to drawn the support fixtures toward one another, and slightly rotate the angle of engagement with the support fixtures. In addition, the dynamic forces otherwise applied to the blade also affect the fixture support point geometries. Examples include flexing of the underlying transportation or storage system (ship flexing, railcar consists dynamics, truck component dynamics, and so forth), and movement and turning of transportation vehicles, etc. In addition, wind loading and vibrations play a role in such dynamic forces. All of these effects vary the distance between the support locations and the angles of engagement between the blade and the support fixtures.

As a side note for this disclosure, an axis generally aligned with the length of a wind turbine blade or a transportation vehicle will be referred to as a "longitudinal" axis. An axis that is generally transverse to a longitudinal axis, such as side-to-side of a transportation vehicle, will be referred to as a "lateral" axis. And, vertically aligned axes will be referred to as "vertical" axes. Although, there may be several degrees of angular misalignment with respect to these reference directions, as will be appreciated by those skilled in the art.

The present disclosure is directed to wind turbine blade support fixtures that engage blades along their midsections, in an area referred to as a "support region." The support region portion of a blade may be reinforced at the time of manufacture in order to accommodate higher forces induced by support fixture engagement therewith and clamping forces applied to the blade. In one embodiment these clamping forces may be has high as 400 PSI. The fixtures of the present disclosure engage the blades at their support regions and accommodate movement of the blades with respect to the support fixtures. The movements accommodated include rotation about a laterally oriented axis, rotation about a vertically oriented axis, and movement along a lateral axis, generally aligned with the geometric centerline of the blade. Various embodiments accommodate blades' major chord angular position with respect to the support fixtures. This angle may lay the blade close to horizontal, or rotated therefrom, depending on the other logistics parameters, as will be appreciated by those skilled in the art. The fixtures of the present disclosure are designed to be reusable, and are designed to accommodate various blade configurations and transpiration vehicles. These fixtures are also modular in design and stackable, enabling compact storage or transportation, particularly in storage yards and on ocean going and barge vehicles.

Reference is directed to FIG. 1, which is an elevation drawing of a wind turbine blade 4 supported by shipping and storage fixtures according to an illustrative embodiment of the present invention. A support surface 2 provides the base of support for a root end fixture 12 and an articulated support fixture 14. The support surface 2 may be a yard or dock surface, the deck of a ship or barge, a consist of railcars, a truck frame assembly, or other suitable, generally horizontal, support surface. Various root fixtures 12 types may be utilized, and these generally attach to the blade's root end 6 flange, as will be appreciated by those skilled in the art. The support region 10 is located along the blade's midsection between the root end 6 and the tip end 8. This location varies between blade configurations.

Reference is directed to FIG. 2, which is an elevation drawing of plural stacked wind turbine blades supported by shipping and storage fixtures according to an illustrative embodiment of the present invention. Each of several root fixtures 12, 22, 26 are stackable upon one another. Each of several articulated support fixtures 14, 20, 24 are also stackable upon one another. In addition, these fixtures can also stack in a side-to-side manner, so it is possible to position a matrix of wind turbine blade, such as a ship load, for example. The blades 4, 16, 18 are correspondingly supported by these plural fixtures. In an illustrative embodiment, these plural fixtures have twistlock corner casting connectors located at their plural corners. Several fixtures can then be joined together by inserting twistlock coupling fasteners between pairs of corner castings, as is well known to those skilled in the art. Hereinafter, these will be referred to as twistlock corners and twistlock fasteners, respectively.

Reference is directed to FIG. 3, which is a perspective view drawing of a wind turbine blade 4 supported by shipping and storage fixtures 12, 14 according to an illustrative embodiment of the present invention. The root end fixture 12 is bolted to the wind turbine blade 4, and allows selective rotational positioning of the blade 4 about its geometric longitudinal centerline. The articulated support fixture 14 is according to an illustrative embodiment of the present disclosure, and will be more fully discussed hereinafter. Note that the apparatuses and methods of the present disclosure enable configuration of articulated support fixture 14 to also enable selective rotational positioning of the blade 4 about its geometric longitudinal centerline. This is significant in that different modes of transpositions, such as ocean versus truck versus rail, benefit from orientation adjustment. For example, trucking may benefit from a more vertical blade orientation keep load widths narrow, but ocean transportation may benefit from more horizontal blade orientation to facilitate tighter stacking of plural blades, as will be appreciated by those skilled in the art.

Reference is directed to FIG. 4, which is a perspective view drawing of an articulated clamping fixture 14 according to an illustrative embodiment of the present invention. The fixture 14 comprises a base frame 30 and a stacking frame 32 that are joined together using twistlock fasteners (not shown) joining twist lock corners 36 of the stacking frame 32 with twistlock corners 34 of the base frame 30, as illustrated. In this manner the stacking frame 32 is removable for insertion of the blade (not shown) into the base frame 30. Note that in modes of transportation where blade stacking is not to be utilized, the stacking frame 32 may be omitted altogether. The base frame 30 corners fittings 34 may be utilized to join adjacent frames together as well as securing the frames to a platform or mounting surface. Note that in this embodiment, a pair of generally horizontal support beams 38 are incorporated into the base frame 30, which serve as the primary support members for carrying the loads induced by the blade. The support beams 38 support a fixture table 40 through an articulated mount assembly (not shown, see item 52 in FIG. 5). A clamping fixture, comprising a first frame half 42 with first conformal surface 46, and a second frame half 44 with second conformal surface 48, is coupled to the fixture table 40.

The articulated clamping fixture 14, comprises the base frame 30 and the stacking frame 32, and also includes a compliment of fittings and accessories that may be deemed necessary or desirable to systems designers. These include various reinforcing gusset plates, attachment D-rings, access ladders, forklift slots, and bracing, as illustrated, and as will be appreciated be those skilled in the art. In the illustrative embodiment, the frames 30, 32 are fabricated from steel alloys having suitable strength characteristics for the loads and forces involved, as will be appreciated by those skilled in the art. Other materials can certainly be employed within the scope of the present invention.

Figure 5:
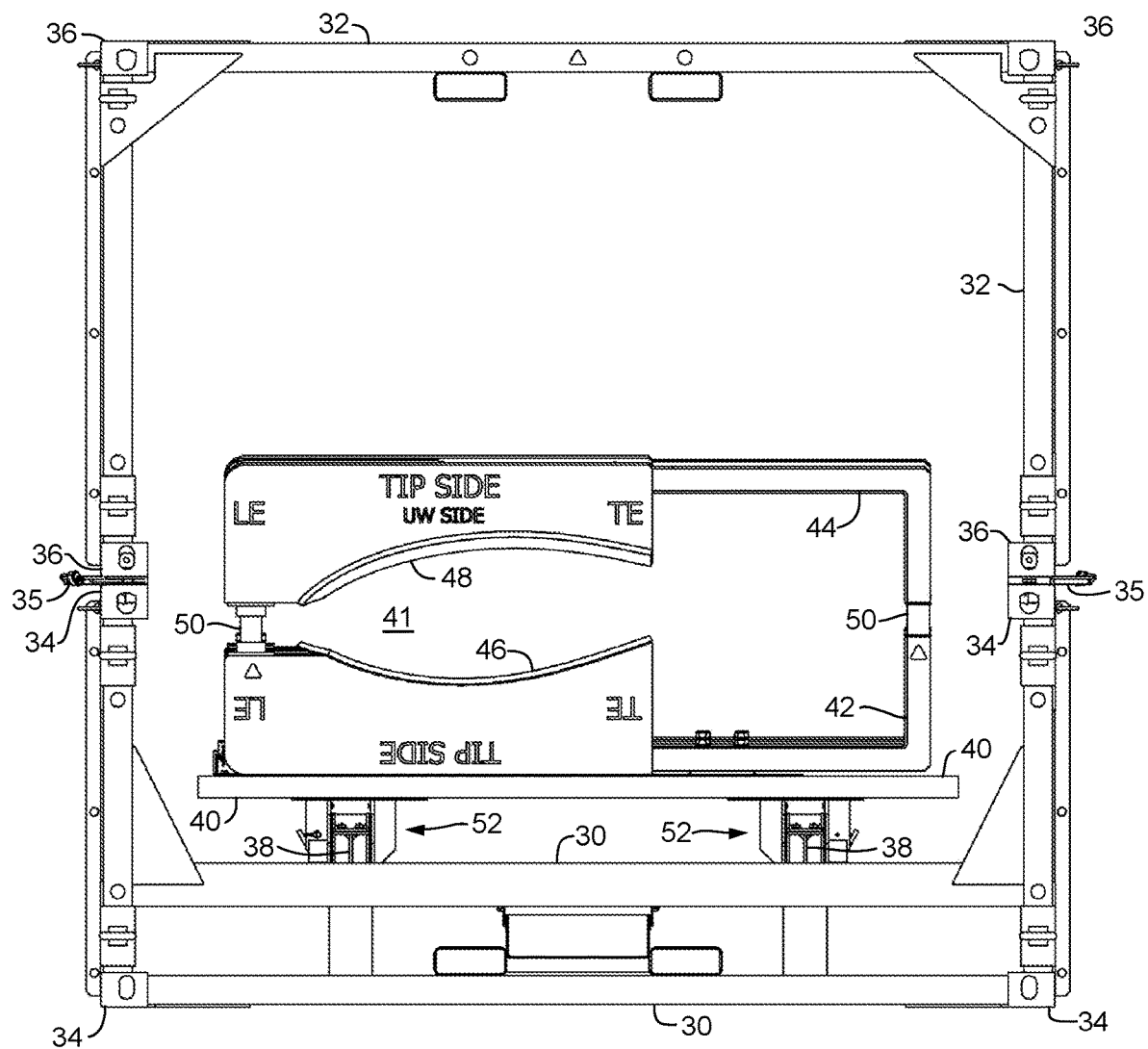
FIG. 5 is an end view drawing of an articulated clamping fixture according to an illustrative embodiment of the present invention.

Reference is directed to FIG. 5, which is an end view drawing of an articulated clamping fixture 14 according to an illustrative embodiment of the present invention. The base frame 30 and stacking frame 32 with their respective twistlock corners 34, 36 joined by twistlock fasteners 35 are illustrated. Base frame 30 support beams 38 as shown, with an articulated mount assembly 52 resting on each, and supporting the fixture table 40. Atop the fixture table 40 is a blade clamp assembly 41, comprising the first frame half 42 with first conformal surface 46 and a second frame half 44 with second conformal surface 48. The blade clamp assembly 41 can be inverted, as compared to the view illustrated, and can also be supported at various angular positions, to thereby orient the rotational position of the wind turbine blade (not shown). The two frame halves 42, 44 are joined with attachments 50, which can be adjusted to apply a desired amount of clamping force, and may include rigid or elastic components to control such forces.

Figure 6:
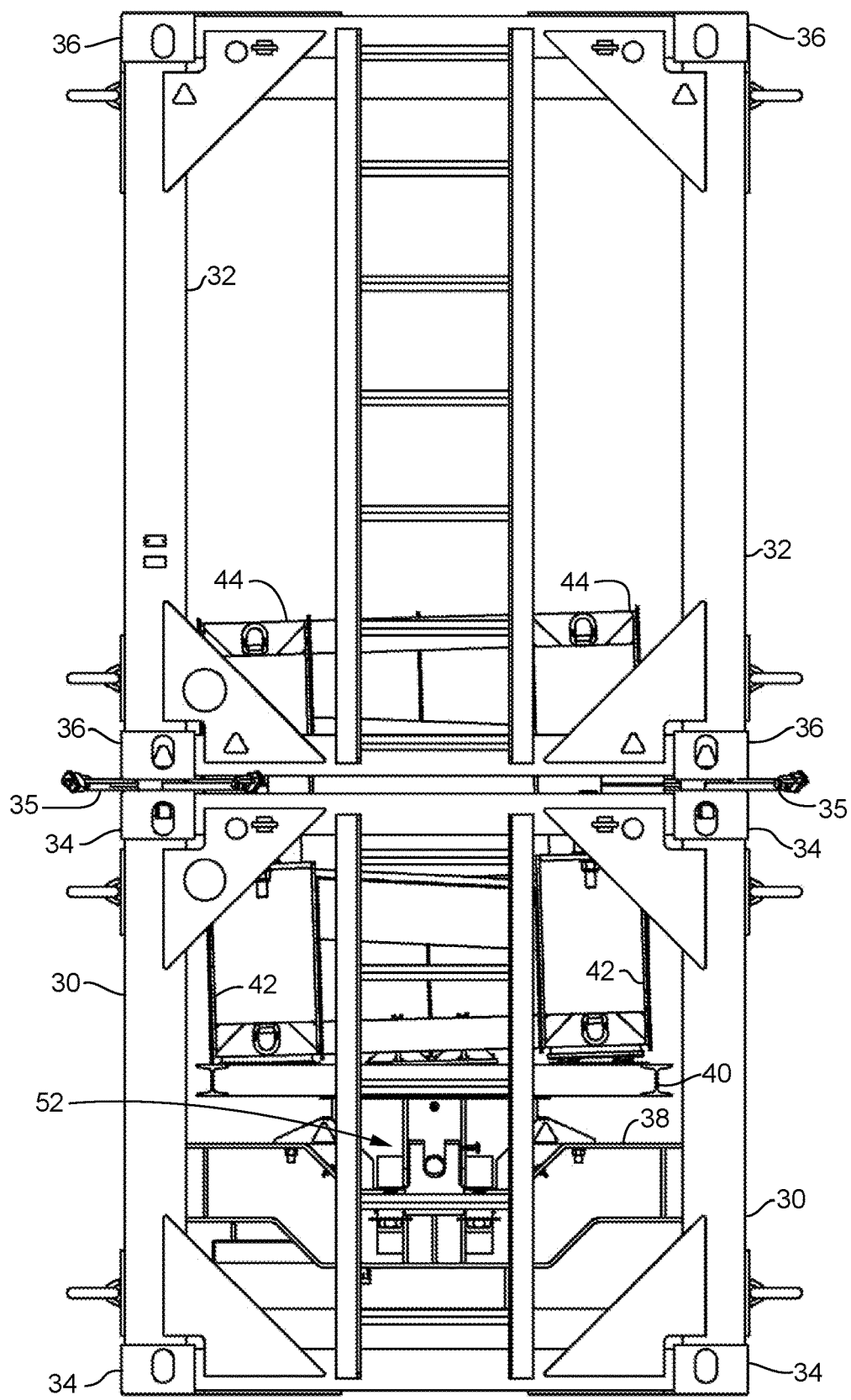
FIG. 6 is a side view drawing of an articulated clamping fixture according to an illustrative embodiment of the present invention.

Reference is directed to FIG. 6, which is a side view drawing of an articulated clamping 14 fixture according to an illustrative embodiment of the present invention. The base frame 30 and stacking frame 32 with their respective twistlock corners 34, 36 joined by twistlock fasteners 35 are illustrated. One of the base frame 30 support beams 38 is shown, with an articulated mount assembly 52 resting thereon, and supporting the fixture table 40. Atop the fixture table 40 is a blade clamp assembly, comprising the first frame half 42 and a second frame half 44.

Figure 7:
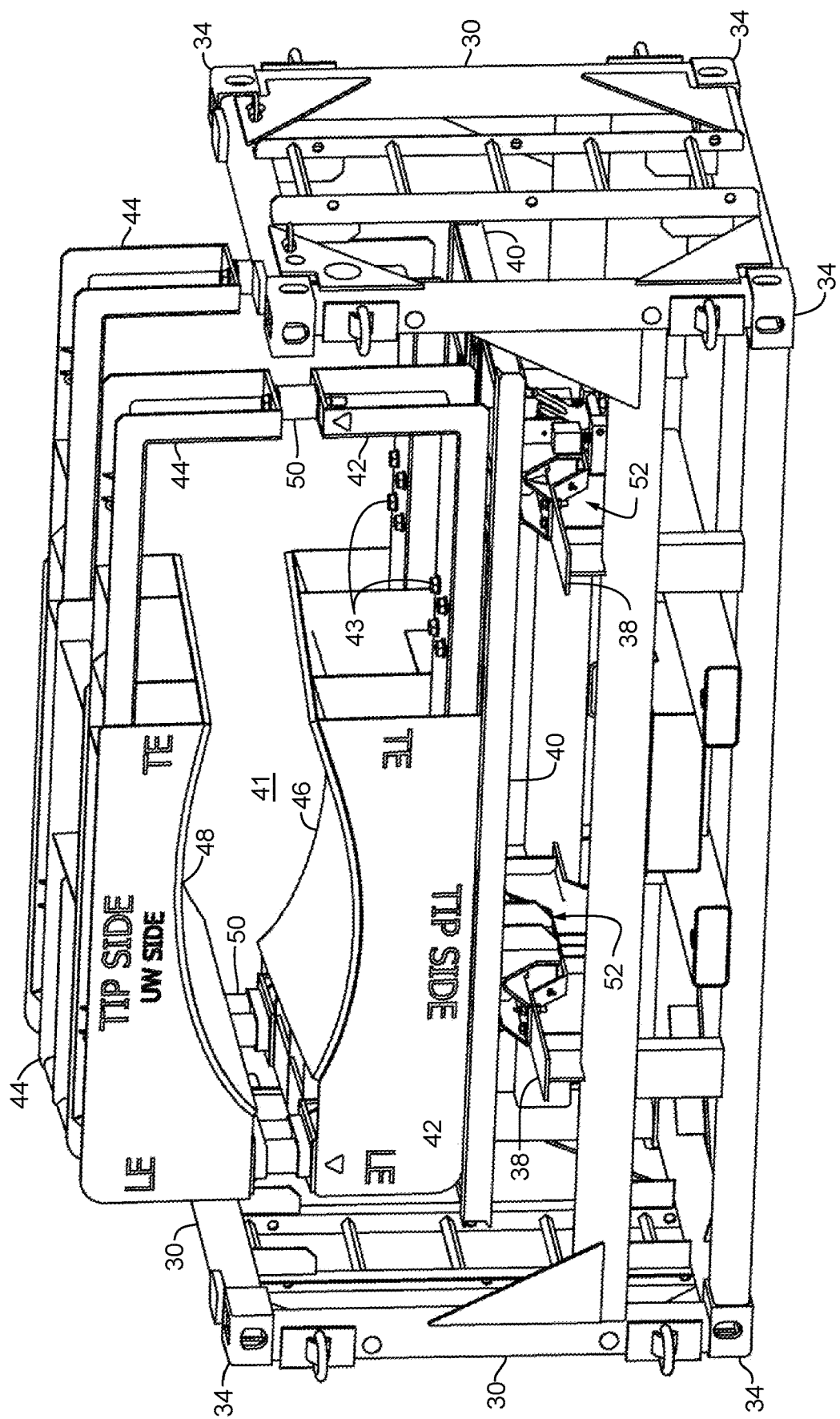
FIG. 7 is a perspective view drawing of an articulated clamping fixture without a stacking frame according to an illustrative embodiment of the present invention.

Reference is directed to FIG. 7, which is a perspective view drawing of an articulated clamping fixture 14, but without the upper frame portion, according to an illustrative embodiment of the present invention. The base frame 30 with its twistlock corners 34 is illustrated, and also illustrating the pair of support beams 38. The articulated mount assemblies 52 rest on those beams 38, and support the fixture table 40, which in turn supports the blade clamp assembly 41, comprising the first frame half 42 with first conformal surface 46 and the second frame half 44 with second conformal surface 48. The halves are joined with attachments 50. In this embodiment, the blade clamp assembly 41 is bolted 43 to the fixture table 40 and fitted to align with the wind turbine blade (not shown).

Figure 8:
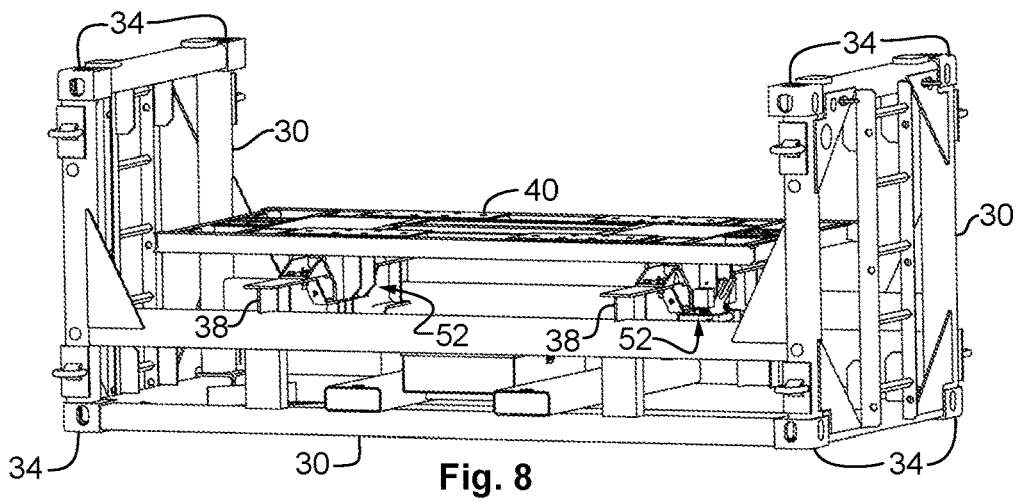
FIG. 8 is a perspective view drawing of the base portion of an articulated support fixture according to an illustrative embodiment of the present invention.

Reference is directed to FIG. 8, which is a perspective view drawing of a base portion of an articulated support fixture according to an illustrative embodiment of the present invention. The base frame 30 is illustrated and includes the pair of support beams 38. The articulated mount assemblies 52 rests on the beams 38 and support the fixture table 40. This arrangement represents a 'generic' fixture assembly, ready to receive whatever blade fixture mount (nothing shown in this view) may be needed. In the prior drawing figures, these were the blade clamp assembly 41. Contrast this arrangement with the fixture arrangement illustrated in FIGS. 9 and 10, as follows.

Figure 10:
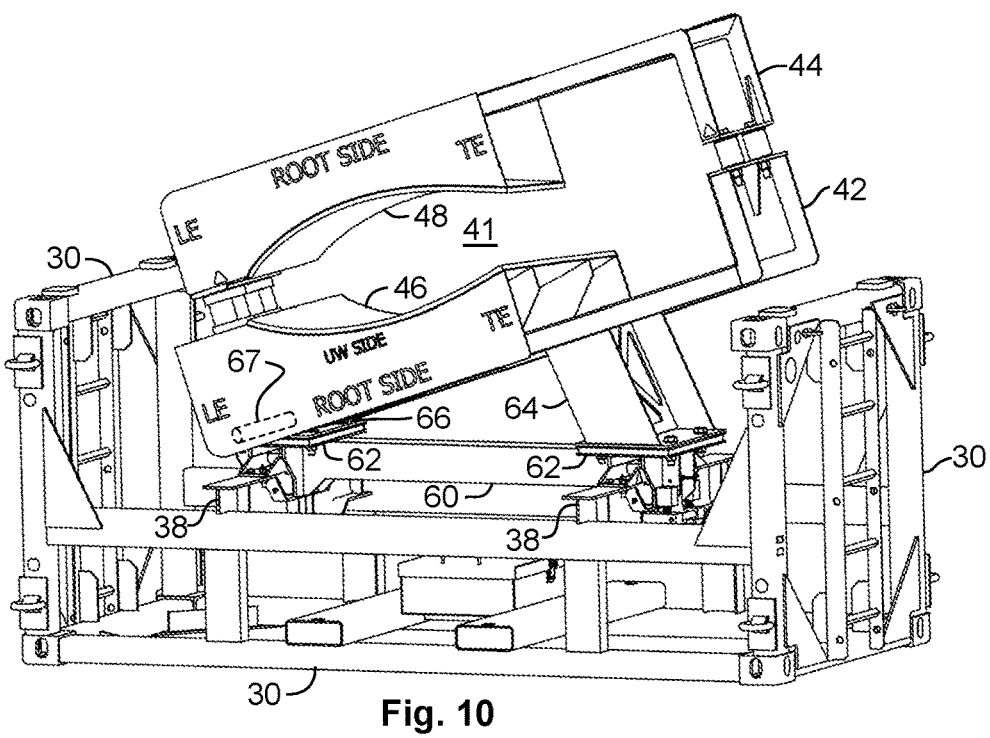
FIG. 10 is a perspective view drawing of the base portion of an articulated support fixture with blade clamp according to an illustrative embodiment of the present invention.
Figure 9:
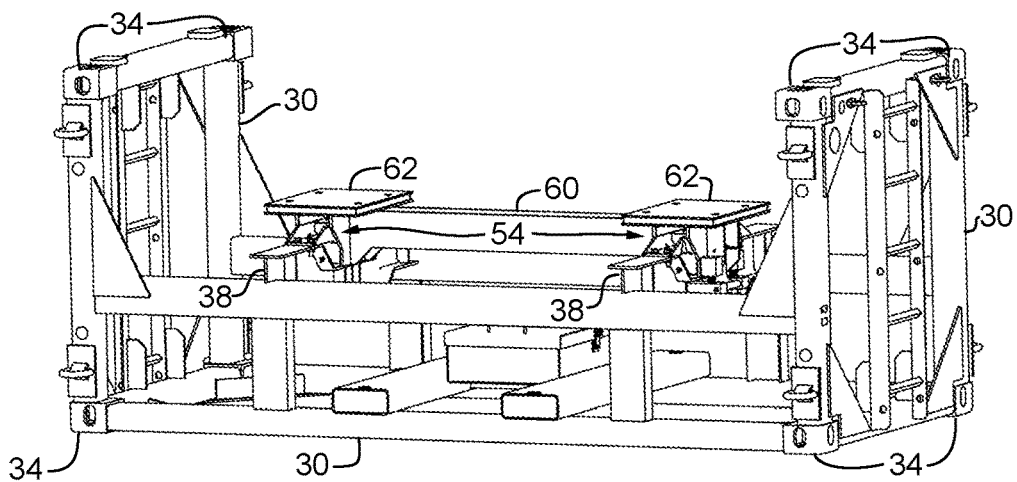
FIG. 9 is a perspective view drawing of the base portion of an articulated support fixture according to an illustrative embodiment of the present invention.

Reference is directed to FIG. 9, which is a perspective view drawing of the base portion of an articulated support fixture according to an illustrative embodiment of the present invention. This embodiment also illustrates the base frame 30 with its twistlock corners 34 and support beams 38. However, in this embodiment, an integrated articulated mount 60 is provided, and which rests on the beams 38. The mount 60 include articulated assemblies 54 and mounting plates 62. Thus, the embodiment does not provide a generic fixture table, but rather a pair of mounts 62 for engaging a suitable fixture mount (not shown). FIG. 10 illustrates the addition of an angled fixture mount.

Reference is directed to FIG. 10, which is a perspective view drawing of the base portion of an articulated support fixture with blade clamp according to an illustrative embodiment of the present invention. FIG. 10 corresponds with FIG. 9, but with the addition of the blade clamp assembly 41 attached to the mounting plates 62 using a hinged mount 66 and an inclined mount 64. A pin 67 is provided as the hinge axis for the hinged mount 66. By selecting an inclined mount of predetermined length, the angle of inclination of the clamp fixture 41 can be controlled to set the rotational angle of the wind turbine blade (not shown) within the fixture. This embodiment illustrates a degree of flexibility in the overall articulated support fixture design in that the same base frame 30 and blade clamp assembly 41 are employed in a manner to vary and control the blade's rotational orientation. Difference spacer mount designs can be employed to provide for a virtually unlimited number of blade positions and orientations. This is highly advantageous in a universal fixture set that may transport many blade designs from many blade vendors, some of which have yet to be implemented.

Figure 11:
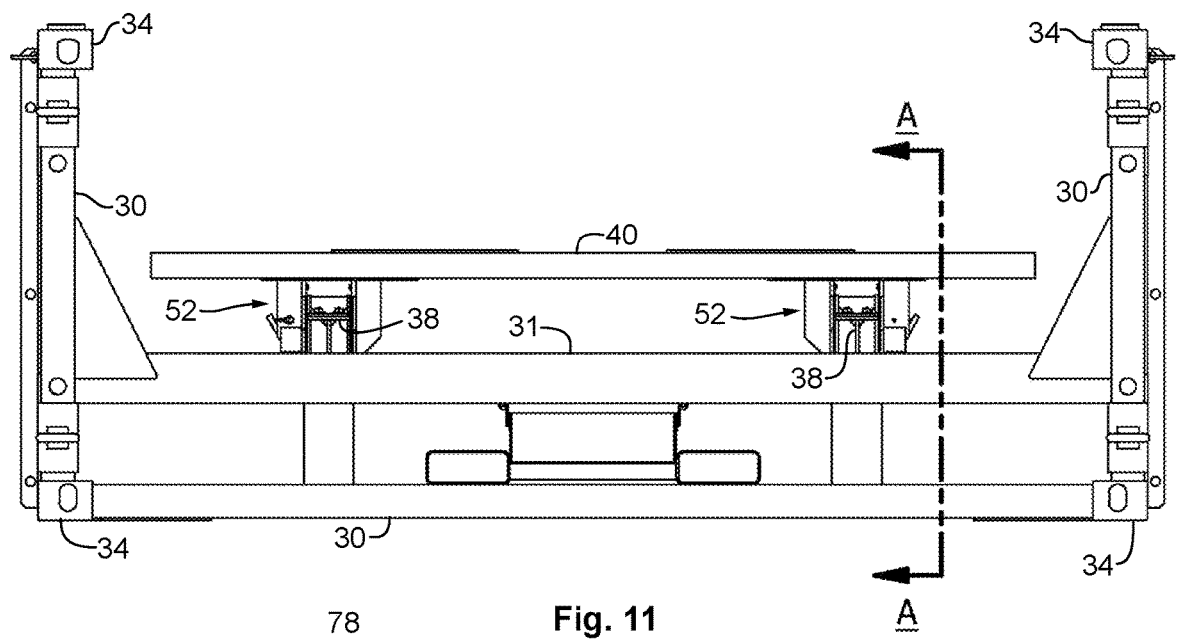
FIG. 11 is an end view drawing of the base portion of an articulated support fixture according to an illustrative embodiment of the present invention.
Figure 12:
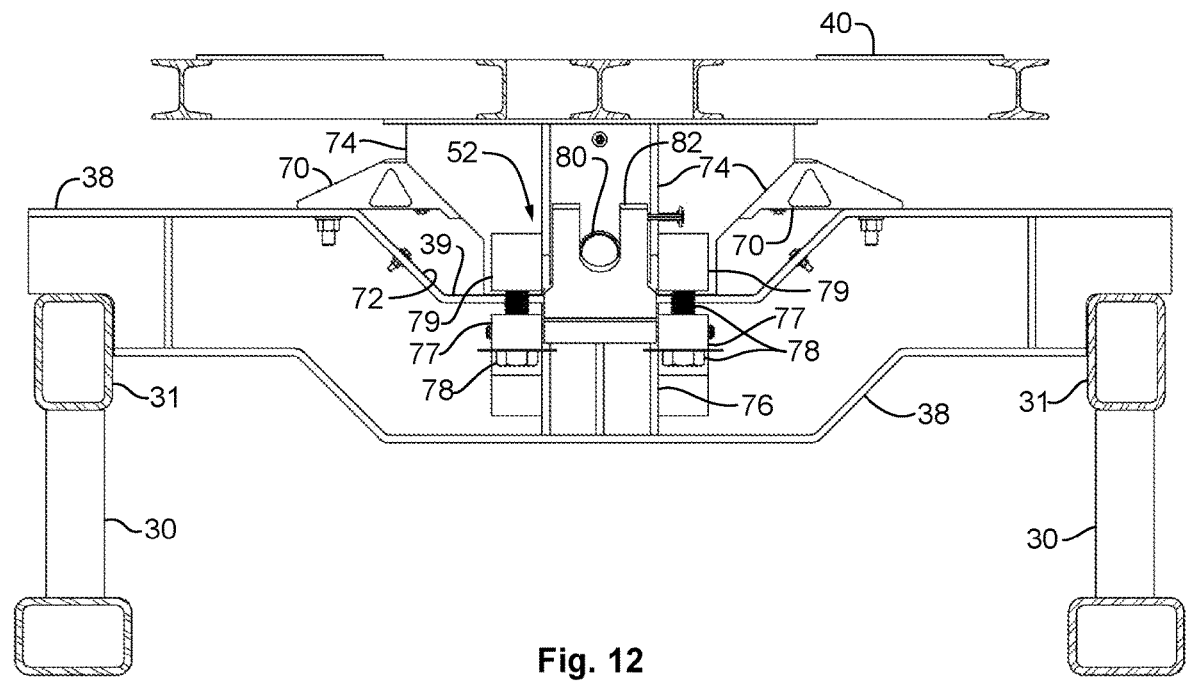
FIG. 12 is side section view drawing of the base portion of an articulated support fixture according to an illustrative embodiment of the present invention.

Reference is directed to FIG. 11 and FIG. 12, which are an end view drawing and corresponding section view drawing, respectively, of the base portion of an articulated support fixture according to an illustrative embodiment of the present invention. The base frame 30 is illustrated, particularly detailing the support beams 38, which have a dropped-center region 39 that defines a bearing slide area that engages the aforementioned articulated mount assemblies 52. In the illustrative embodiment, the support beams 38 are connected to the base frame 30 with cross beams 31 at either end, as illustrated. As discussed hereinbefore, the fixture table 40 rests upon the articulated mount assemblies 52. FIG. 12 particularly illustrates further details of the articulated mount assemblies 52. A bearing block retention member 70 straddles the dropped center region 39 of the support beams 38, and, the benefits of this arrangement will be more fully discussed hereinafter. The degrees of articulation provided by the articulated mount assemblies 52 includes a longitudinal sliding degree, and sliding rotation about a vertical axis degree, and a lateral axle 80 rotational degree. Each of these will be more fully discussed hereinafter. Given that there are several degrees of articulation freedom, it is also noted that these degrees of articulation may need to be limited and controlled during utilization of the fixture set, which means that the amount of movement and rotation are controlled by the fixture design.

In FIG. 12, the fixture table 40 rest upon a fixture mount 74, which is supported by a laterally oriented axle 80 that engaged a bearing block (no shown in this view), and which enables the fixture table 40 to rotate about that lateral axle 80. The bearing block will be more fully discussed hereinafter, but for now, understand that the bearing block slides about the surface of the dropped center region 39 of the support beam 38 in this embodiment. This dropped center regions 39 is also referred as the bearing slide area. The bearing slide area is covered with a friction reducing material 72. In the illustrative embodiment, this material is stainless steel. Stainless steel provides a commercially available mill finish that does not require specific machining prior to implementation. Other metal and polymeric materials can be employed, and that design decision would be based largely on load forces and environmental considerations, as will be appreciated by those skilled in the art. Thus, the fixture mount is free to articulate by rotation about the lateral axles 80, as well as sliding longitudinal movement and sliding vertical rotational movement as the bearing blocks cooperatively slide about the bearing slide area 39.

During utilization of the articulated mount assembly 52, the freedom of articulated movement is beneficial. However, during loading and unloading operations, and during unloaded transit of the fixture, this freedom of movement can be problematic for work crews and rigging operation, and may cause damage to the fixture itself. To alleviate these issues, certain locking members are provide to secure the fixture mount 74 and fixture table 40 in fixed portion until a blade is lowered into position on the articulated support fixture. These locking members include two systems; one with plural jacking screw assemblies 77, 78, 79 and the other a position lock member 82 attached to a support bracket 76. The position lock member 78 will be more fully described hereinafter, but essentially, it rotates into a position between ribs on the fixture mount 74 and interferes with the fixture mount's ability to move about any of the degrees of articulation. The jack screw arrangement includes a pair of threaded blocks 77 attached to the bracket 76 through which two threaded screws 78 are driven to engage a mechanical stop 79 fixed to the fixture mount 74. With both screws 78 urged against the stop blocks 79, the fixture mount 74 is held in fixed position.

Figure 13:
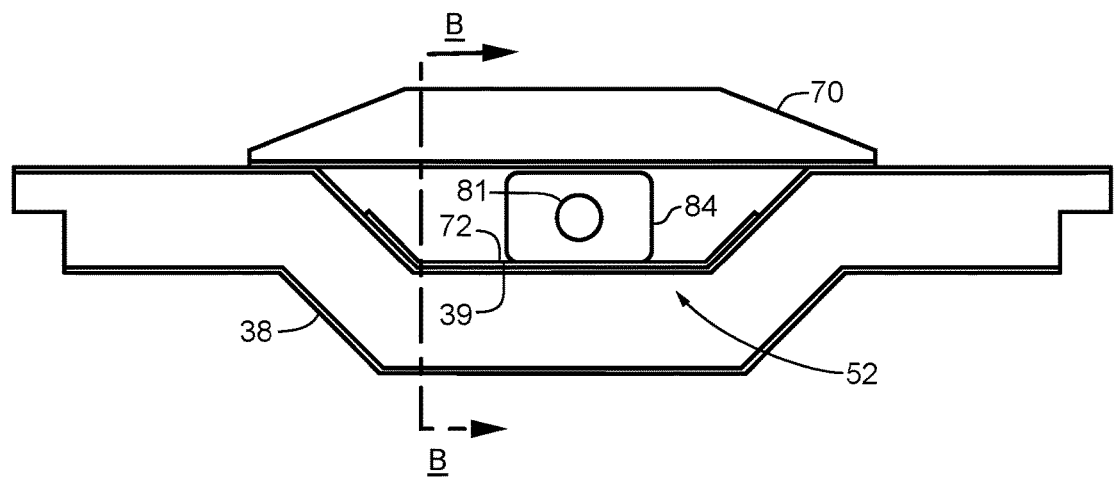
FIG. 13 is a side view drawing of a sliding bearing block arrangement according to an illustrative embodiment of the present invention.
Figure 14:
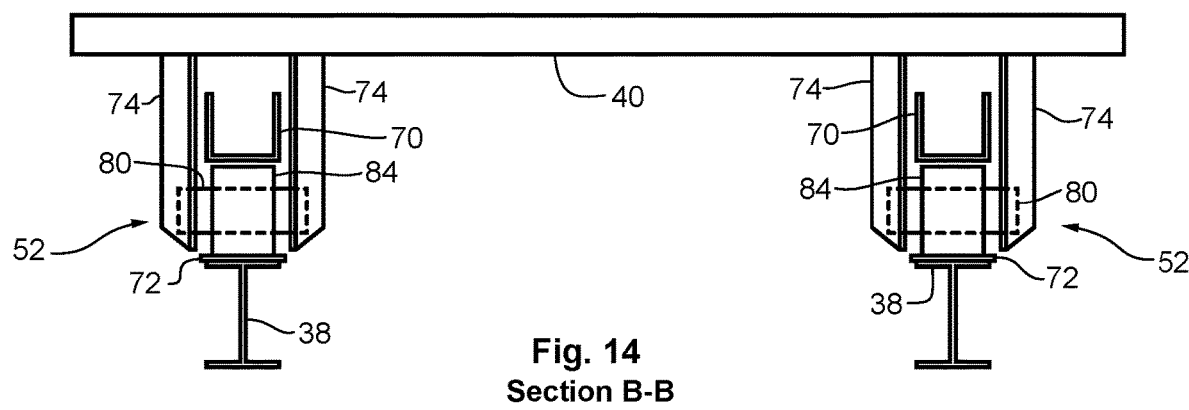
FIG. 14 is an end view drawing of a sliding bearing block arrangement according to an illustrative embodiment of the present invention.

Reference is directed to FIG. 13 and FIG. 14, which are a side view drawing and a section view drawing, respectively, of a sliding bearing block arrangement according to an illustrative embodiment of the present invention. Illustrated are the support beams 38 with the dropped center bearing slide areas 39, and with an anti-friction liner 72 disposed upon the bearing slide area 39. A bearing block 84 is disposed to slide about the bearing slide area 39. The range of sliding movement of the bearing block 84 is limited by the area of the bearing slide area 39, or by other mechanical means, such as physical interference between the base frame, fixture mount, the retention member 70, or other system components and the bearing block itself. The bearing block 84 has a laterally oriented bearing 81, which is a hole formed through the bearing block 84 in the illustrative embodiment. Other rotary bearings could also be employed such as commercial pillow block bearings, commercial flanged bearings, or design-specific bearing assemblies, as are known to those skilled in the art. To prevent the bearing block 84 from lifting upwardly away from the bearing slide area 39, a retention member 70 is fixed to bridge across the dropped center area 39, and thusly capture the bearing block 84. In the illustrative embodiment, the retention member is a fabricated steel C-section that is bolted in place, as illustrated. The fixture mount 74 is fabricated from plate steel with reinforcing gussets and ribs, as illustrated. Axle shaft portions 80 of the fixture mount 74 engage the bearing 81 in the bearing blocks 84 to define a lateral axis of rotation of the fixture mount 74 with respect to the bearing blocks 84. The fixture table 40 is fixed to the fixture mount 74 and presents a surface upon which a wind turbine blade interface, such as the aforementioned cradles mount, can be attached.

Figure 15:
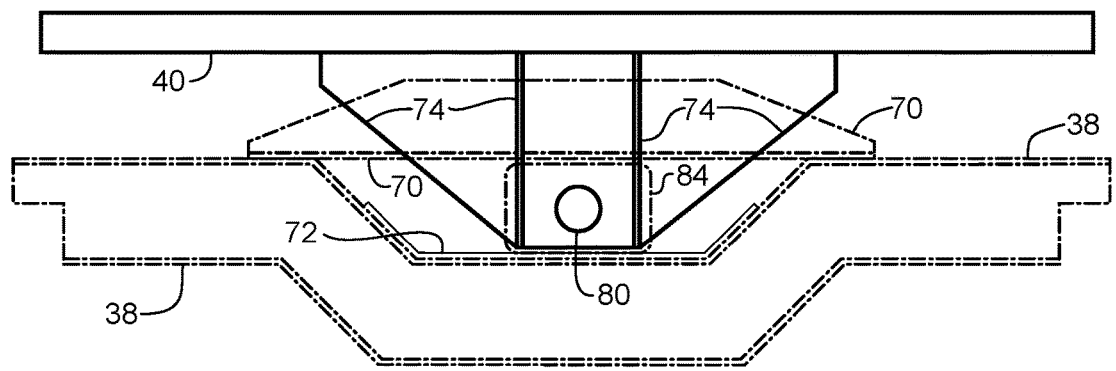
FIG. 15 is a side view drawing of a table type fixture mount according to an illustrative embodiment of the present invention.

Reference is directed to FIG. 15, which is a side view drawing of a table type fixture mount according to an illustrative embodiment of the present invention. The fixture table 40 has a generally flat upper surface for receiving a wind turbine blade interface (not shown). The fixture mount 74 is attached to the bottom of the fixture table 40 and is reinforced with ribs or gussets, as illustrated. Laterally oriented axles 80 are positioned such that bearing portions of each engage the corresponding lateral bearings (not shown) in the bearing blocks 84. The support beam 38, anti-friction liner 72 and retention member 70 are illustrated in phantom for reference.

Figure 16:
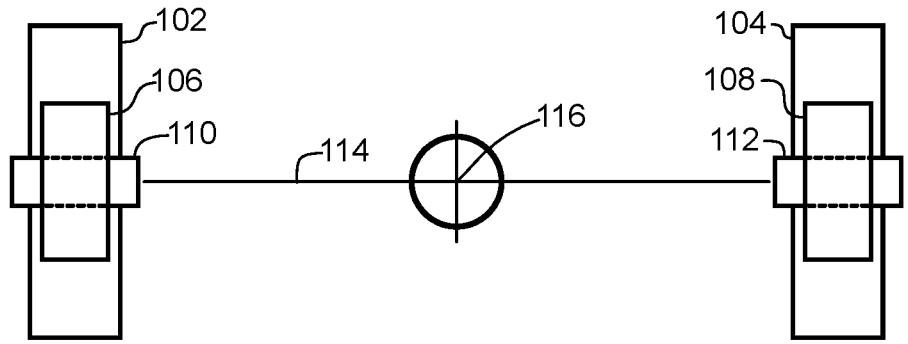
FIG. 16 is a top view drawing of a bearing slide area and bearing block according to an illustrative embodiment of the present invention.

Reference is directed to FIG. 16, which is a top view drawing of a bearing slide area and bearing blocks according to an illustrative embodiment of the present invention. This drawing illustrates the first and second bearing slide areas 102, 104 with first and second bearing blocks 106, 108 disposed at central locations thereof. The bearing blocks 106, 108 engage with first and second axle bearing portions 110, 112 of the laterally oriented axle along centerline 114, and with a center location 116 indicated for subsequent reference. The illustrated portions of the bearing blocks 106, 108 are also the positions while the aforementioned locking members are deployed.

Figure 17:
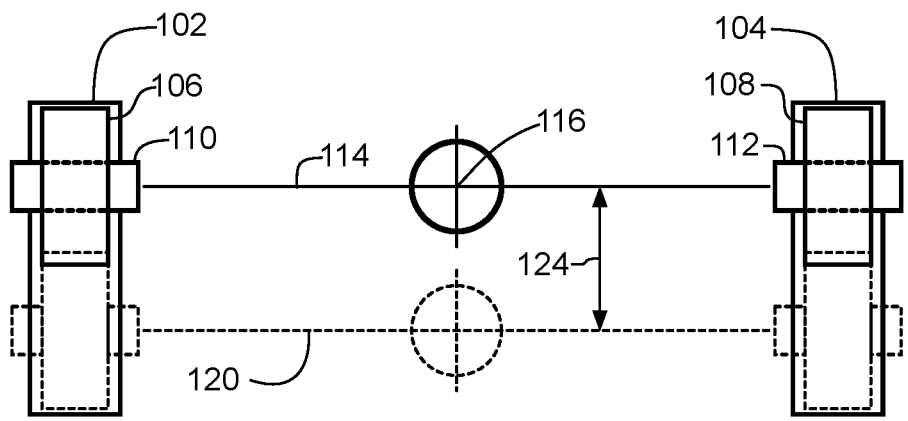
FIG. 17 is a top view drawing of a bearing slide area and bearing block according to an illustrative embodiment of the present invention.

Reference is directed to FIG. 17, which is a top view drawing of bearing slide areas and bearing blocks according to an illustrative embodiment of the present invention. This drawing also illustrates the first and second bearing slide areas 102, 104 with first and second bearing blocks 106, 108 disposed thereon, together with their respective first and second axle bearing portions 110, 112 of the laterally oriented axle along centerline 114. However, in this drawing, the bearing blocks have slid to one extreme direction of longitudinal movement. Also shown, in broken line, are the same components slid to the opposite extreme, illustrating the range of longitudinal movement 124 afforded by the fixture system. In an illustrative embodiment the range of longitudinal movement is approximately 240 millimeters.

Figure 18:
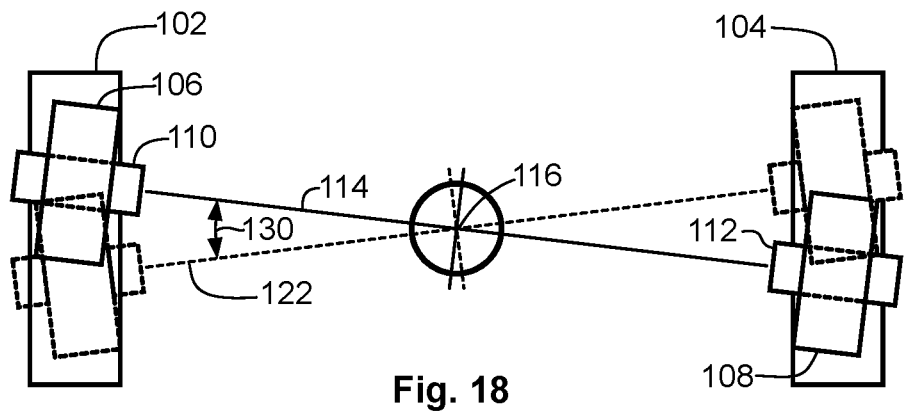
FIG. 18 is a top view drawing of a bearing slide area and bearing block according to an illustrative embodiment of the present invention.

Reference is directed to FIG. 18, which is a top view drawing of bearing slide areas and bearing blocks according to an illustrative embodiment of the present invention. This drawing also illustrates the first and second bearing slide areas 102, 104 with first and second bearing blocks 106, 108 disposed thereon, together with their respective first and second bearing portions 110, 112 of the laterally oriented axle along centerline 114. However, in this drawing, the bearing blocks have slid to rotate about vertical centerline 116 in one extreme direction. Also shown, in broken line, are the same components slid to rotate to the opposite extreme, illustrating the range of rotational movement 130 afforded by the fixture system.

Figure 19:
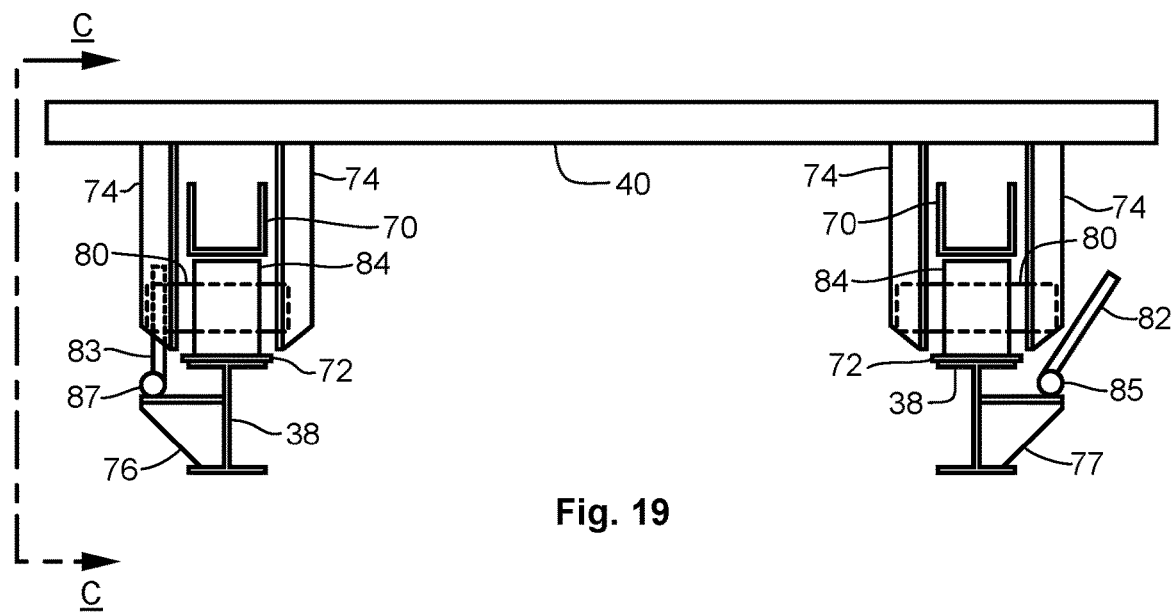
FIG. 19 is an end view drawing of bearing blocks and fixture mount with locking member according to an illustrative embodiment of the present invention.
Figure 20:
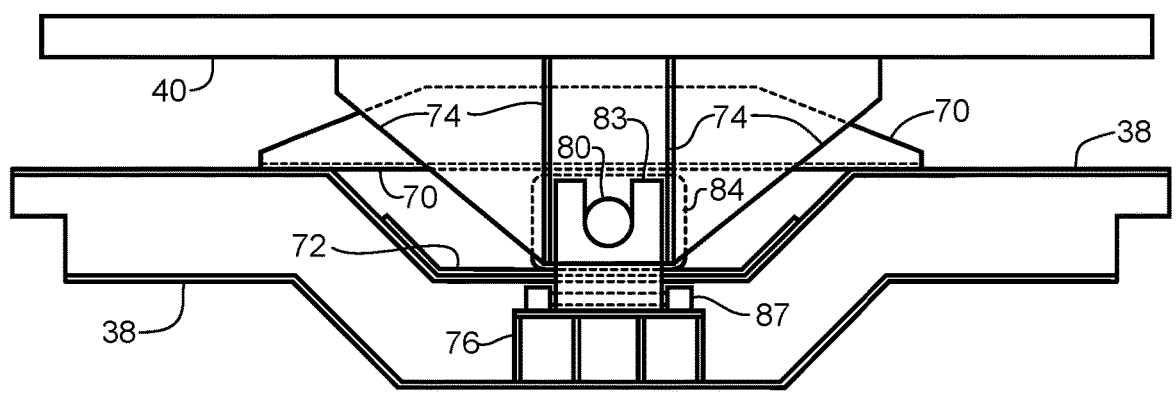
FIG. 20 is a side section view drawing of bearing block and fixture mount with locking member according to an illustrative embodiment of the present invention.

Reference is directed to FIG. 19 and FIG. 20, which are an end view drawing and a corresponding side-section view drawing, respectively, of bearing blocks and fixture mount with locking members according to an illustrative embodiment of the present invention. Illustrated are the support beams 38 with the dropped center bearing slide areas 39, and with an anti-friction liner 72 disposed upon the bearing slide area 39. The bearing blocks are illustrated together with the retention members 70 and the fixture mount 74 with axles 80, and the fixture table 40. In these figures, a first and second locking members are illustrated. On the left side of FIG. 19, there is a bracket 76 attached to the support beam 38, which has a hinge member 87 fixed thereto and with a locking member 83 that may be rotated upwardly to interfere with movement of the fixture mount 74. Likewise, on the right side of FIG. 19, there is a bracket 77 attached to the support beam 38, which has a hinge member 85 fixed thereto and with a locking member 82 that may be rotated upwardly to interfere with movement of the fixture mount 74 as well. Both of these locking members 82, 83 can be individually engaged or disengaged. Note that the locking members conform to the clearances required for the fixture mount 74 and axles shafts 80, as illustrated.

Figure 21:
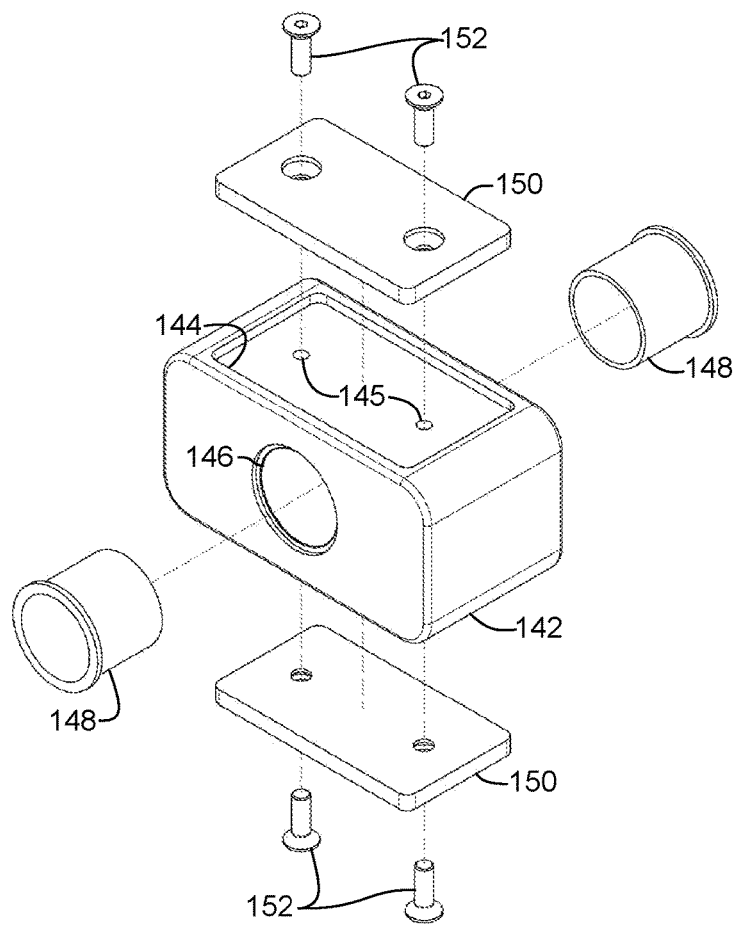
FIG. 21 is an exploded view drawing of a bearing block according to an illustrative embodiment of the present invention.
Figure 22:
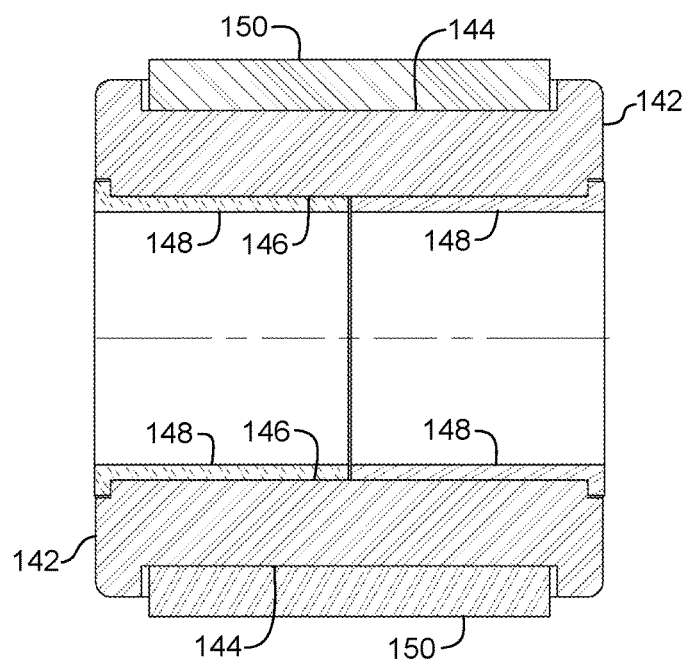
FIG. 22 is a section view drawing of a bearing block according to an illustrative embodiment of the present invention.

Reference is directed to FIG. 21 and FIG. 22, which are an exploded view drawing and section view drawing, respectively, of a bearing block assembly according to an illustrative embodiment of the present invention. This design is based on the structural requirements of an 80 meter wind turbine blade, and it is noted that other bearing block configuration and materials may be employed within the scope of the present teachings, as will be appreciated by those skilled in the art. The primary design considerations will be load and forces applied, as well and environmental requirements. In the illustrative embodiment, salt water exposure during ocean transport is the primary environmental consideration. A block of steel 142 is fabricated, as illustrated, and has upper and lower recesses 144 formed therein for receiving corresponding slide plates 150. The steel block 142 is drilled and tapped 145 to receive threaded fasteners 152 to retain the slide plates 150 in the recesses 144. A hole 146 is bored through the block 142 for receiving a pair of opposing flanged sleeve bearings 148. The slide plates 150 may be fabricated from graphite and the sleeve bearings may be fabricated from sintered bronze, as will be appreciated by those skilled in the art.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. An articulated support fixture for a wind turbine blade, the blade having a root-end, a support region, and a tip-end, all along a generally longitudinal axis, the support fixture comprising:
    a base frame, having first and second bearing slide areas disposed horizontally thereupon;
    first and second bearing blocks, disposed to slide about said first and second bearing slide areas, and each including a laterally oriented bearing;
    a fixture mount having a laterally oriented axle with first and second bearing portions that correspondingly engage the laterally oriented bearings of said first and second bearing blocks, to thereby enable said fixture mount to articulate about said lateral axle, and wherein
    said first and second bearing slide areas are configured to enable said first and second bearing blocks, together with said fixture mount, to slide along a generally longitudinal path, and to further enable rotation of said fixture mount about a vertical axis as said first and second bearing blocks cooperatively slide upon said first and second bearing slide areas, and
    a wind turbine blade interface attached to said fixture mount, to thereby enable engagement with, and support of, the wind turbine blade along its support region.

2. The articulated support fixture of claim 1, and further comprising:
    first and second anti-friction liners disposed upon said first and second bearing slide areas, to thereby reduce friction between said first and second bearing slide areas and said first and second bearing blocks.

3. The articulated support fixture of claim 1, and wherein:
    said first and second bearing blocks have limited range of motion to slide upon said first and second bearing slide areas by interference between said first and second bearing blocks or said fixture mount and said base frame.

4. The articulated support fixture of claim 1, and wherein:
    said first and second bearing blocks further include a slide plate disposed upon a surface thereof for slidable engaging said bearing slide area.

5. The articulated support fixture of claim 1, and wherein:
    said laterally oriented bearings are holes formed into said first and second bearing blocks, and further including
    a sleeve bearing disposed within said laterally oriented bearing.

6. The articulated support fixture of claim 1, and wherein:
    said first and second bearing portions of said laterally oriented axle are cylindrical members of said fixture mount, which rotatably engage said laterally oriented bearings in said first and second bearing blocks.

7. The articulated support fixture of claim 1, and further comprising
    first and second retention members fixed to said base frame and aligned to retain said first and second bearing blocks against upward vertical movement.

8. The articulated support fixture of claim 1, and wherein:
    said base frame comprises plural twistlock corner castings disposed about corner positions thereof, and further comprising;
    a stacking frame having plural twistlock corner castings disposed about corner positions thereof, and arranged for disposition over the wind turbine blade and connection to said base frame using said twistlock fasteners, and configured to engage a second base frame upon an upper portion thereof, to thereby stack plural wind turbine blades.

9. The articulated support fixture of claim 1, and further comprising:
    a generally planar platform fitted to an upper portion of said fixture mount for presenting a flat surface to support said wind turbine blade interface.

10. The articulated support fixture of claim 1, and further comprising:
    an inclined mount adapter disposed between said fixture mount and said wind turbine blade interface to enable selective rotational position of the wind turbine blade within the articulated support fixture.

11. The articulated support fixture of claim 1, and wherein:
    said wind turbine blade interface includes a lower conformal clamp portion fitted to said fixture mount, and
    an upper conformal clamp portion selectively attachable to said lower conformal clamp portion, to thereby apply clamp force about the support region of the wind turbine blade.

12. The articulated support fixture of claim 1, and further comprising:
    a position lock member disposed between said base frame and said fixture mount to selectively lock and release movement and rotation of said fixture mount with respect to said base frame.

13. A method of providing articulated support of a wind turbine blade, the blade having a root-end, a support region, and a tip-end, all along a generally longitudinal axis, using a base frame, bearing blocks with laterally oriented bearings, a fixture mount with a lateral axle that has bearing portions, and a wind turbine blade interface, the method comprising the steps of:
    selecting first and second bearing slide areas laying horizontally upon the base frame;
    disposing first and second bearing blocks to slide about the first and second bearing slide areas;
    engaging first and second bearing portions of the fixture mount laterally oriented axle with the laterally oriented bearings of the first and second bearing blocks, thereby enabling the fixture mount to articulate about the lateral axle;
    defining the area of the first and second bearing slide areas, thereby enabling the first and second bearing blocks, together with the fixture mount, to slide along a generally longitudinal path, and further enabling rotation of the fixture mount about a vertical axis as the first and second bearing blocks cooperatively slide upon the first and second bearing slide areas, and
    attaching a wind turbine blade interface to the fixture mount, thereby engaging and supporting the wind turbine blade along its support region.

14. The method of claim 13, and further comprising:
    disposing first and second anti-friction covers upon the first and second bearing slide areas, thereby reducing friction between the first and second bearing slide areas and the first and second bearing blocks.

15. The method of claim 13, and further comprising the step of:
   limiting the range of movement of the first and second bearing blocks upon the first and second bearing slide areas in said defining step by interfering with the first and second bearing blocks movement using the fixture mount and the base frame structures.

16. The method of claim 13, and wherein the laterally oriented bearings are holes formed into the first and second bearing blocks, and wherein the first and second bearing portions of the laterally oriented axle are cylindrical members of the fixture mount, and further comprising the steps of:
   rotatably engaging the cylindrical members of the fixture mount with the holes formed in the first and second bearing blocks.

17. The method of claim 13, and further comprising the step of:
   attaching and aligning first and second retention members to the base frame to retain the first and second bearing blocks against upward vertical movement.

18. The method of claim 13, and wherein the base frame includes plural twistlock corner castings disposed about corner positions thereof, and further comprising the steps of;
   disposing a stacking frame over the wind turbine blade, the stacking frame having plural twistlock corner castings disposed about corner positions thereof, and connecting the stacking frame to the base frame using the plurality of twistlock fasteners.

19. The method of claim 13, and further comprising the steps of:
   fitting a generally planar platform to an upper portion of the fixture mount, thereby presenting a flat surface for connecting the wind turbine blade interface.

20. The method of claim 13, and further comprising the steps of:
   disposing an inclined mount adapter between the fixture mount and the wind turbine blade interface, thereby enabling selective rotational position of the wind turbine blade within the articulated support fixture.

21. The method of claim 13, and wherein the wind turbine blade interface includes a lower conformal clamp portion fitted to the fixture mount, and an upper conformal clamp portion selectively attachable to the lower conformal clamp portion, and further comprising the steps of:
   applying clamping force about the support region of the wind turbine blade between the lower conformal clamp portion and the upper conformal clamp portion.

22. The method of claim 13, and wherein the articulated support fixture further includes a position lock member disposed between the base frame and the fixture mount, and further comprising the steps of:
   selectively locking and releasing movement and rotation of the fixture mount with respect to the base frame.

* * * * *